SERVOMOTOR CONTROL SYSTEM
Filed Aug. 19, 1949 4 Sheets-Sheet 1
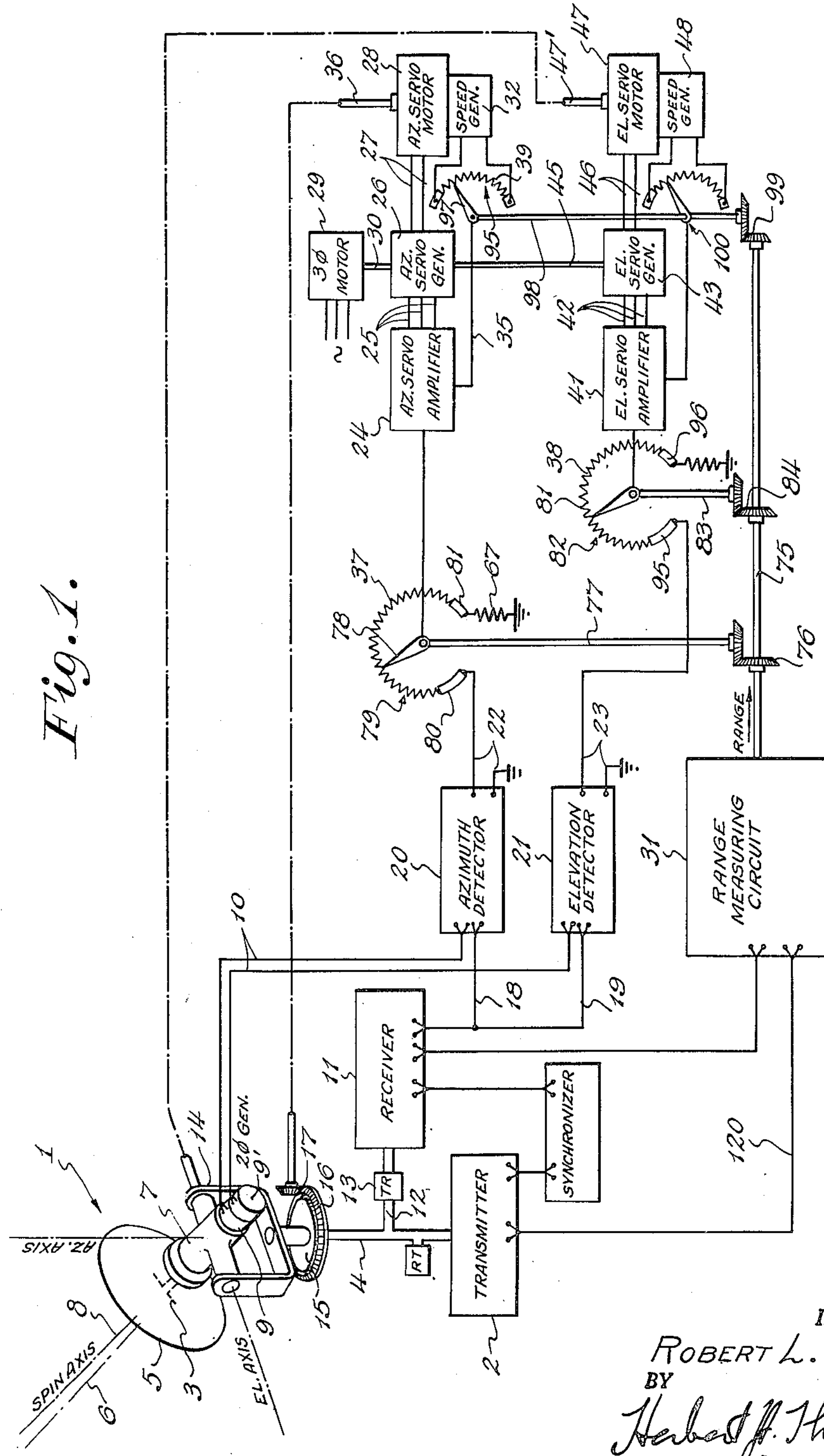
INVENTOR.
ROBERT L. WATHEN
BY
Herbert H. Thompson
his ATTORNEY.

SERVOMOTOR CONTROL SYSTEM
Filed Aug. 19, 1949 4 Sheets-Sheet 2
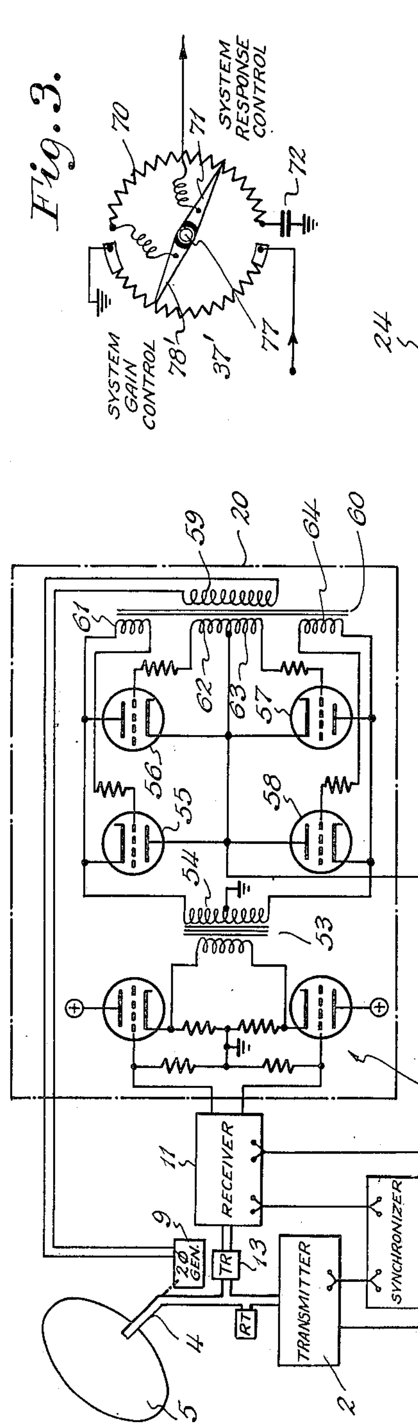
INVENTOR.
ROBERT L. WATHEN
BY
Herbert H. Thompson
his ATTORNEY.

Jan. 4, 1955 R. L. WATHEN 2,698,932
SERVOMOTOR CONTROL SYSTEM
Filed Aug. 19, 1949 4 Sheets-Sheet 3
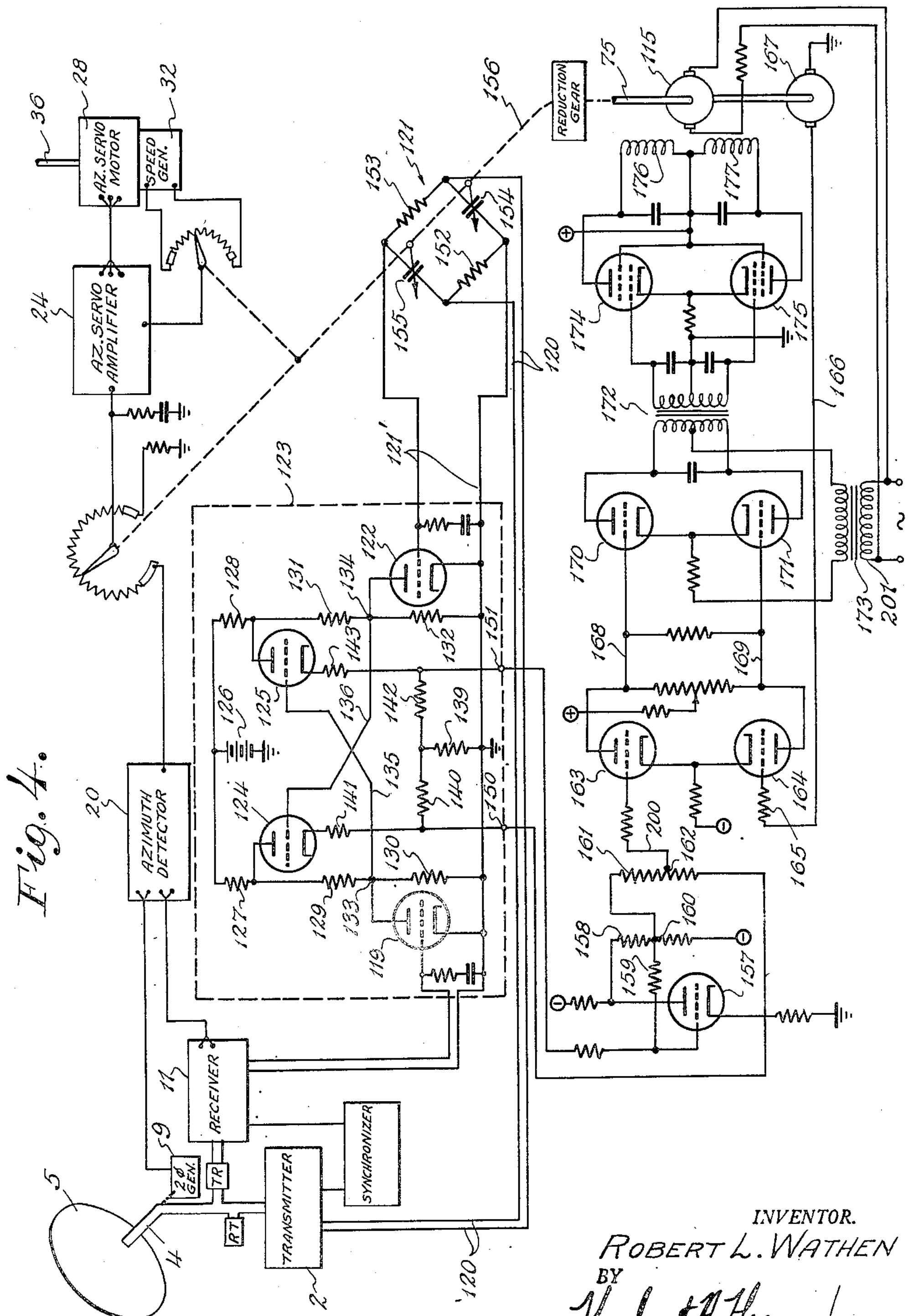
INVENTOR.
ROBERT L. WATHEN
BY
Herbert P. Thompson
his ATTORNEY SERVOMOTOR CONTROL SYSTEM
Filed Aug. 19, 1949 4 Sheets-Sheet 4
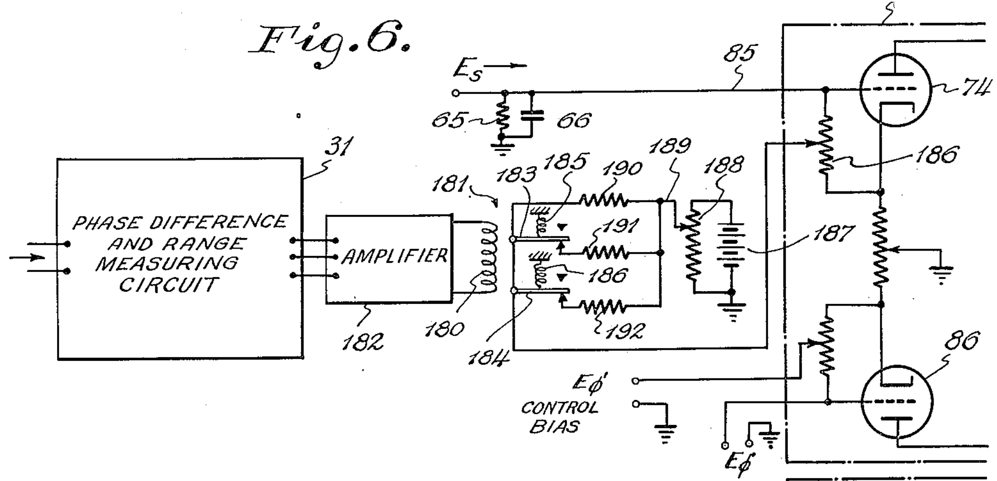
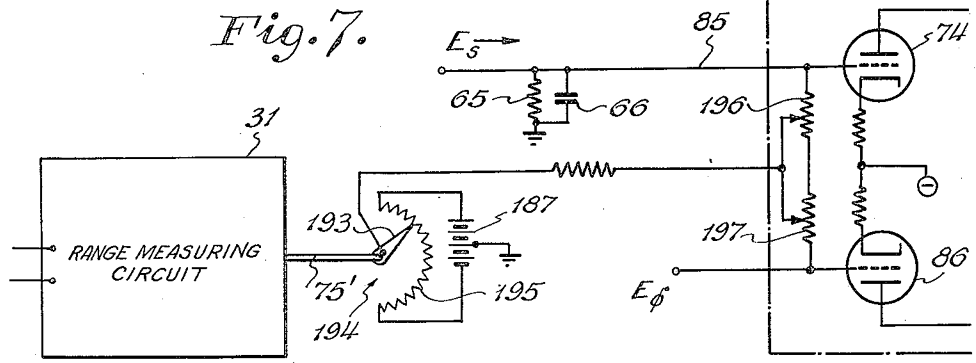
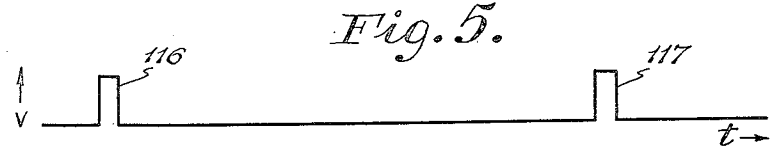
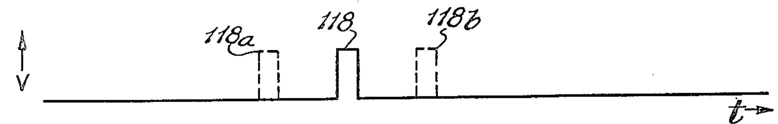
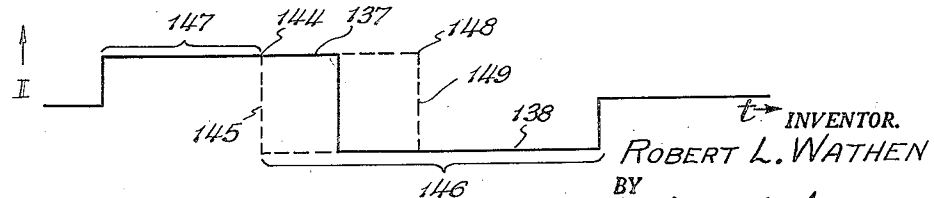
INVENTOR.
ROBERT L. WATHEN
BY Herbert H. Thompson
his ATTORNEY United States Patent Office 2,698,932

Patented Jan. 4, 1955

2,698,932

SERVOMOTOR CONTROL SYSTEM

Robert L. Wathen, Hempstead, N. Y., assignor to The Sperry Corporation, a corporation of Delaware Application August 19, 1949, Serial No. 111,177

10 Claims. (Cl. 343—7.4)

My invention relates to a servomotor control system and particularly to an automatic control system for servomotors, such as those employing a control signal derived from radar equipment.

In automatic tracking apparatus, for use in which my invention finds particular application, it becomes necessary so to control the servomotors that both distant and close targets, in terms of range, which are flying a straight line course, may be tracked with smoothness and stability. For example, such targets, whether airplanes, flying bombs, or the like, require relatively low angular velocities and accelerations of the servomotors when at a distance or at long horizontal ranges. When their range is short, however, or when the targets fly directly overhead, relatively high velocities and high accelerations of the servomotors are required.

Since the error signal controlling the servos is derived from radar or radio equipment, considerable filtering is necessary to prevent the servos from responding to spurious signals of frequencies higher than that of the true error signal. Response to such spurious signals produces a rough or uneven tracking performance. Obviously, the smoothing value of such filtering is highest for distant targets when the true error signal changes are at low frequencies. However, for low horizontal target ranges, the response of the servos should be higher to provide higher rates and accelerations and under such conditions it becomes desirable to increase the frequency response or the ability of the system to respond to faster changing signals and to provide higher output rates and accelerations even though a sacrifice in signal filtering may occur. The present invention comprises a servomotor system in which the response is variable to render the servos capable of tracking targets under all conditions of range and up to present day maximum rates of such targets within permissible error values and with smoothness and stability.

Since the present invention is particularly adapted for use in an automatic tracking system, I will hereinafter describe my invention in this particular connection, although it will be understood that its use is not limited to the particular arrangement herein illustrated and described.

In an automatic tracker of the character herein disclosed, a tracking head or scanner comprising an antenna is mounted for movement both in azimuth and elevation and separate servomotors are connected to drive the tracker in each of those modes of movement. The antenna comprised in the tracker is, in the embodiment shown, of the directional type and functions to transmit a radio wave which, upon reflection from a target, is received thereby and is coupled to a suitable receiver. The receiver, generally speaking, provides signals from which are derived three primary control signals. These are, signals proportional to range, to azimuth, and to elevation. The latter two signals control the azimuth and elevation servos in such a manner as to cause the tracker to follow a chosen target or object, that is, to maintain the directivity axis of the tracker substantially on or directed toward the target.

As above indicated, considerable filtering of the received signals is necessary in order to obtain smooth automatic tracking performance and the degree of filtering so required is such that excessive errors result when following a target having a course requiring high accelerations of the tracker near the cross-over position. By the term "cross-over position" I mean the position of the target when the direction thereto from the tracker lies normal to its course.

In order to render the tracker capable of smooth, automatic tracking performance under conditions requiring both relatively high and low accelerations thereof, I propose in the present invention to provide means for varying the gain and/or response of the servo system and also preferably the gain of the amplifier, which controls the rate of the servomotor in accordance with error control signals supplied thereto, and to vary the response and/or gain in accordance with the magnitude of the range of the target or object being tracked.

The term "gain" as herein employed with respect to the servomotor system is the ratio of an output value, such as velocity, of the system with respect to the value of the error in accordance with which the system is primarily controlled, and the gain of the amplifier is the ratio of its voltage output to the signal input thereto. The term "response" as herein employed is intended to designate the sensitivity of the system to rapidly changing error signals or the rapidity with which it responds to signals having relatively high rates of change of amplitude, whereby the lag between tracker and target under high accelerations is less for an increased or higher response of the system.

When tracking a target at relatively long ranges, relatively low accelerations are involved. In such case the response of the system and/or the amplifier may be relatively low so that it will not respond to spurious errors or error voltages of comparatively high frequencies. On the other hand, when the course or speed of the target requires high accelerations on the part of the tracker i. e. when the target is at relatively low ranges, the response of the system and/or the servo amplifier should be relatively increased in order to render the system responsive to relatively higher signal frequencies, and to reduce lag between the tracker and the target.

It is, therefore, a primary object of the present invention to provide a servo system particularly adapted for use in an automatic tracker which includes means for varying the over-all gain of said system in accordance with the magnitude of the range of the object being tracked.

It is also another primary object of this invention to provide a tracking servomotor system, the response of which is varied in accordance with the magnitude of the range of the target being tracked.

It is a further object to provide a response-controlled system of the foregoing character in which the response thereof is increased with a decrease in the range of the object being tracked; and a system in which the gain of the system is increased with a decrease in the range of the object being tracked. In automatic tracking systems, practice has shown that the performances thereof are satisfactory when the servo system has a certain response and gain for target speeds up to some predetermined range but that the response and gain should be decreased for ranges in excess thereof.

It is, therefore, a further object of the present invention to provide means in a tracking servo system whereby the response thereof is increased for decreases in the range of the object being tracked and which response is decreased for increases in the range of the object being tracked.

From another viewpoint, other objects of my invention reside in providing a servo system the response of which is varied in accordance with the range of the object, the response being increased with decreased ranges in the following ways: by varying the gain of the system, by varying the magnitude of signal voltage supplied to the amplifier per unit of error, by varying the time constant of the signal voltage integrating network which may be embodied in said system, and by additionally varying the output of the means or network which feeds back a stabilizing or damping voltage to the amplifier in the present system, whereby to enable the tracker to track high or low speed targets at long or short ranges without losing them and with smoothness and stability under all of these operating conditions.

In the automatic tracker herein shown, the response of the system is continuously adjusted over a predetermined range of operation of the tracker, for example, to provide selective operating performances under all conditions up to the highest airplane speeds now obtainable. In the present invention the response of the system may be automatically controlled in the same manner as the gain. Additionally, however, and for illustrative purposes, I have shown what constitutes primarily a response control which is automatically adjusted, by the output of a range measuring means, for best servo performance. It is therefore a further object of the present invention to provide means whereby the response of the servo system is automatically adjusted to provide the best performance of the servo system under existing range conditions.

In the disclosed embodiments of the present invention, I may control the response of the system by means of a voltage divider and voltage integrating network. It is, therefore, a further object of the invention to provide means whereby the time constant of the integrating network may be varied to thereby vary the response of the tracking servomotor system.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In practically all servo systems and particularly in servo systems employed in automatic trackers and the like, it is necessary to provide some means for stabilizing the servo, that is, to damp its operation and prevent undue oscillations in the servo loop. Ordinarily, this is accomplished by deriving a voltage which is proportional to the output rate of the servomotor and applying this damping voltage in a degenerative sense to the signal amplifier. To reduce what is termed "speed lag," that is, the degenerative effect of the damping signal under constant speed conditions, it is customary to employ a network including a condenser for passing the damping signal only under transient speed conditions of the servo output, that is, under acceleration or deceleration, the damping signal being blocked under constant output rates of the servo. I have found that, in a tracking servo system of the character to which the present invention relates, it becomes highly desirable to vary the magnitude of the damping voltage when varying the response and gain of the system in order to provide desirable and acceptable servo performances. It is therefore a further object of the present invention to provide means whereby the suitable controlling or damping voltage is varied substantially simultaneously and substantially to the same extent as the response and gain of the system is varied.

Additionally, it is a still further object to provide a servo system of the character herein contemplated which is so constructed and arranged as to be aperiodic for all conditions of adjustment as above outlined, that is, one which has no oscillations therein due solely to variations in circuit constants or changes in response and gain.

With the foregoing and other objects in view, my invention includes the novel elements and the combinations and arrangements thereof described below and illustrated in the accompanying drawings, in which Fig. 1 is a diagrammatical representation of an automatic tracker embodying the combinations of the present invention;

Fig. 2 is a wiring diagram of the signal voltage amplifier and associated mechanisms for controlling the gain, response and stability of the servo system;

Fig. 3 shows an alternative structure for simultaneously varying the gain and response characteristics of the tracking servomotor system;

Fig. 4 shows a wiring diagram of a circuit for producing an output proportional to the range of the object being tracked.

Fig. 5 illustrates voltage curves of the received radio energy which are compared in a phase difference measuring circuit and a current curve of the differential current flow in the output of said circuit.

Fig. 6 shows a modification of the present invention wherein the gain of the servomotor amplifier is adjusted in accordance with the output of the range measuring means; and Fig. 7 shows a further modification similar to that shown in Fig. 6.

In the following I will first describe the preferred embodiment of my invention in an automatic or radio tracker indicating generally the various components thereof; and, thereafter, in connection with Figs. 2, 3, 4, and 5, I will disclose the preferred circuits which are indicated in certain of the rectangles shown in Fig. 1.

Referring first to Fig. 1, I indicate generally a radio tracker or radio sighting system which is preferably of the ultra-high-frequency pulse type, such as that described in pending U. S. application Serial No. 441,188 for "Radio Gun Control System" filed on or about April 30, 1942, in the names of C. G. Holschuh et al, now U. S. Patent 2,617,982, granted Nov. 11, 1952. As more completely described in that application, a radio transmitter 2 includes means for generating short periodic pulses of ultra-high-frequency radio energy. These pulses of radio energy are transmitted to an antenna 3 through a suitable transmission channel such as wave guide 4. The antenna, illustrated as a dipole, is mounted within a paraboloid reflector 5 and is adapted to transmit into space in a generally pencil-shaped beam along its directivity axis 6, the pulses supplied to the antenna. The tracker head or radio scanner includes a spin motor 7 adapted to rotate antenna 3 about a spin axis 8 and the scanner as a whole rotates in azimuth and in elevation, while the antenna may spin about said spin axis in any position of the scanner. As shown, the axis 6 of the paraboloid reflector is slightly offset from spin axis 8, so that as a result of the antenna's rotation about said spin axis a conical portion of space is irradiated with short pulses of electromagnetic energy. The rate of rotation of antenna 3 about the spin axis 8 may be, for example, of the order of 200 times less than the pulse repetition rate, so that all portions of the conical angle or zone of space are irradiated.

Also included with the radio scanner and rotated by said spin motor 7 are a pair of two-phase generators 9, 9' which generate two 90° time phase displaced voltages and transmit these voltages on leads 10 to the azimuth and elevation detector circuits, hereinafter described, to provide a time reference of the rotation of antenna 3 about said spin axis.

Should a target lie within the conical portion of space irradiated by the transmitted waves, a portion of the electromagnetic energy striking the target will be reflected back to the antenna and will be received in the form of pulses corresponding to the transmitted pulses, but, of course, delayed in time by an amount proportional to the range or distance of the target or object being tracked. These reflected pulses are transmitted to the radio receiver 11 as by means of wave guide 4 and wave guide 12. If the time difference between the time of transmission of a transmitted pulse and the time of reception thereof in the receiver 11 is measured, such measurement will be proportional to the magnitude of the range of the target or the distance between the antenna and the target being tracked. Such measurement is performed in a suitable range measuring circuit 31 whose output is used as the controlling factor in the system, to be hereinafter more fully described. Also if the target lies along the spin axis 8, which is the line of sight defined by the scanner, it will be apparent that all of the deflected pulses will be of substantially the same intensity. On the other hand, if the target should not lie along spin axis 8, the intensity of the reflected pulses will vary substantially sinusoidally as the antenna rotates about its spin axis, the maximum intensity occurring at the time that the axis 6 most nearly coincides with the target orientation.

A TR box 13 may be associated with the wave guide 12 so as to prevent the high intensity pulses delivered from the transmitter from passing directly to the receiver 11. The TR box functions to block such high intensity signals, but passes the lower intensity waves or pulses which are reflected back from the target and therefor only signals substantially of the amplitude of the reflected pulses are supplied to the receiver 11.

The scanner as herein schematically illustrated is of the type shown in detail in U. S. Patent No. 2,410,831 issued November 12, 1946, to L. Maybarduk et al. for Scanning Devices. The scanner is supported in bearings 14 for movement about the horizontal or elevation axis, while the bearings 14 are in turn mounted on a platform 15 which is supported for rotation in azimuth about an axis extending normal to the platform. A fixed azimuth gear 16 meshes with a pinion 17 which in turn is journalled on the platform 15, and, as hereinafter described, the azimuth servomotor drives pinion 17 to cause the platform and scanner to rotate in one direction or the other in azimuth. Similarly, as hereinafter described, the elevation servo is connected to rotate the scanner in elevation. It will be understood that the wave guide 4 extends from the transmitter to the antenna, suitable provision being made for proper connections to permit the above pointed out movement of the scanner. In practice, the servomotors may be mounted on the platform 15 and Fig. 1 of the drawing is intended to show this arrangement. Likewise, the transmitter, receiver and other components of the system may be mounted to rotate with platform 15.

The radio receiver 11 includes detecting means for providing a sinusoidal signal voltage corresponding to the substantially sinusoidal variation in intensity of the reflected pulses. This signal voltage is supplied by means of leads 18 and 19 to the azimuth and elevation detectors or phase sensitive demodulators. One of the two-phase generators 9 supplies a first reference voltage to the azimuth detector 20 and the other generator 9' supplies a second reference voltage, which is 90° displaced from the first voltage in time phase, to the elevation detector 21. By comparing both the phase and magnitude of the sinusoidal signal voltage derived from receiver 11 with the two 90° phase-displaced reference voltages from the two-phase generators, the azimuth and elevation components of the error voltage derived from receiver 11 may be ascertained. A preferred arrangement of the azimuth or elevation detector or phase sensitive demodulators, is illustrated in Fig. 2 and will later be described, but for the present it will be understood that the output of the azimuth detector is a unidirectional voltage corresponding in magnitude and polarity to the azimuth component of the angular deviation between the target orientation and spin axis 8. The elevation detector in like manner compares the phase and magnitude of the error signal derived from receiver 11 with the second time reference voltage and produces a unidirectional voltage output corresponding in magnitude and polarity to the elevation component of the angular deviation between the target orientation and spin axis 8. As shown in Fig. 1, the unidirectional azimuth error voltage appears across leads 22, one of which may be grounded, and the unidirectional elevation error voltage appears across leads 23, one of which likewise may be grounded.

In practice, in the case of the azimuth servo, a secant-correcting means, such as a potentiometer, is embodied in the system, as shown and described in pending application Serial No. 517,008 which was filed in the U. S. Patent Office on January 5, 1944, in the names of G. E. White and D. S. Pensyl. Briefly, the azimuth signal voltage applied across the potentiometer is a measure of the azimuth error measured in the slant plane in which the tracker follows the target. To obtain a true azimuth error signal, the potentiometer is wound so that the voltages obtained therefrom by means of a wiper or slidable contacts vary approximately as the secant of the angle moved through by the wiper. This wiper is rotated in accordance with the elevation angle of the tracker or line of sight thereof and hence, the voltage derived from said potentiometer, which is supplied to the servo control amplifier, is the error voltage applied to the potentiometer, times the secant of the elevation angle or a signal voltage proportional to the azimuth error measured in the azimuth plane which is a voltage proportional to true azimuth error and necessary for proper control of the azimuth servo.

The unidirectional azimuth error voltage is employed to control the azimuth servo and the elevation error voltage is employed to control the elevation servo. Thus the azimuth error signal on leads 22 is supplied through a potentiometer winding 37 to the input of an azimuth servo amplifier 24 and the elevation error signal on leads 23 is supplied through the winding 38 to the input of an elevation servo amplifier 41. The function of the potentiometers will be hereinafter more fully described. The outputs of the azimuth and elevation amplifiers are connected in controlling relation to the azimuth elevation servomotors 28 and 47. The azimuth and elevation servos in the embodiment illustrated are of the Ward-Leonard type, each servomechanism including a generator, 26, 43 which are driven by a preferably constant speed three-phase motor 29 through shafts 30 and 45. The azimuth servomotor 28, is energized by the output of generator 26 and the elevation servomotor is energized by the output of generator 43. Other types of servomotors or servomechanisms may, of course, be employed.

For damping purposes, the output of servomotor 28 is connected to drive a permanent magnet or speed generator 32 which functions to supply a unidirectional control voltage having a magnitude proportional to the rate of the servo output and of a polarity depending upon the direction of rotation of the azimuth servo. The output of PM generator 32 is supplied through suitable damping network and potentiometer winding 39, hereinafter to be described, to the azimuth amplifier 24. The azimuth servo drives pinion 17, hereinbefore described, through suitable shafting and gears from the output shaft 36 of the servomotor 28.

The elevation servo loop is generally similar to the above described azimuth servo loop. That is to say, the output of the elevation detector and demodulator 21 is supplied to the elevation servo control amplifier 41 which may be of the same construction as the corresponding azimuth amplifier 24. The output of amplifier 41 is supplied by leads 42 to control the field windings of the elevation servo generator 43. This generator, like azimuth generator 26, may be driven from constant speed motor 29 through the medium of shaft 45, the output of elevation generator 43 being supplied by leads 46 to the elevation servomotor 47. As in the case of the azimuth servo system, elevation servomotor 47 is connected to drive a PM or speed generator 48, the output of which is supplied through a suitable damping network and potentiometer 100 to control the elevation servo amplifier 41. The output shaft 47' of the elevation servomotor is shown schematically as connected to drive the scanner in elevation through suitable shaft and gearing indicated schematically.

As above indicated, I propose to control the over-all gain of the above outlined tracking servomotor system by a measure of the magnitude of the range of the tracked object. To accomplish this I have shown apparatus indicated in Fig. 1 by the rectangle 31 which includes a range measuring circuit whose output is illustrated as a shaft rotation which is proportional to the range of the object. The details of the range measuring circuit will be hereinafter more fully described in connection with Fig. 4 of the drawings. The output of the range measuring circuit 31 appears as a rotation of shaft 75 which, through suitable gearing 76, rotates shaft 77. This shaft is connected to rotate the wiper 78 of potentiometer 79 to thereby control the magnitude of the input signal to azimuth servo amplifier 24. The winding 37 of potentiometer 79 has at each end thereof a portion 80 and 81 which has substantially fixed resistivity so that as the wiper 78 passes these portions there will be substantially no change in the signal level supplied to the azimuth servo amplifier 24. These fixed resistivity portions are provided so that if the range of the tracked object is below or beyond certain predetermined limits the attenuation of the signal and the amplifier will remain constant. That is, if the target has a range exceeding these predetermined limits the signal will not be attenuated below a predetermined value.

The control signal to the elevation servo amplifier is controlled in exactly the same manner; the output of the range measuring circuit being applied to rotate potentiometer wiper 81 of potentiometer 82 through shaft 83 and gearing 84. The potentiometer winding 38 has portions 95 and 96 at each end thereof which serve the same purpose as those portions above described with respect to potentiometer 79.

In accordance with the present invention I also propose to vary the magnitude of the rate feed-back or stabilization signal, above described, in accordance with a measure of the magnitude of the range of the target or object being tracked. Thus, I provide a potentiometer 95 whose winding 39 is directly across the output of speed generator 32. The output of the potentiometer 95 is varied in accordance with range through the displacement of wiper 97 by shaft 98 and is rotated in accordance with range through gear 99 and the range output shaft 75. The rate feed back to the elevation servo amplifier 41 is varied in the same manner through potentiometer 100 as described with respect to the azimuth servo amplifier 24.

The details of the range measuring circuit 31 will now be described, reference being made to Fig. 4 of the drawings. As hereinabove stated, the phase relation of the pulses derived from transmitter 2 and those received in receiver 11 will be a measure of the range or distance from the instrument or ground station to the chosen craft or target. For example, in Fig. 5, I have shown pulses 116 and 117 as the voltage wave derived from the transmitter. I have also shown pulse 118 as the received pulse, pulse 118 being the reflected energy corresponding to the transmitted pulse 116. Both of these pulses are supplied to a phase-difference measuring circuit, the output of which is a signal voltage of a polarity sense depending upon whether the received signal pulse 118 lies to one side or the other of the midpoint between pulses 116 and 117 or any other arbitrary point relative to the transmitted pulses. Under the conditions herein assumed for descriptive purposes, if the relative positions of the pulses 116, 117 and 118 should vary, the spacing between pulses 116 and 117 being a constant, the signal voltage derived from the phase-difference measuring circuit causes the servomotor to operate in a direction such that the phase-shifting network operated thereby will shift the reference pulses derived from the transmitter in a direction to center the received pulse at the midpoint between consecutive transmitted pulses. Hence, the output of the servo will constitute a measure of range which varies with variations in actual range of the object from which received pulse 118 is reflected.

Referring again to Fig. 4, it will be seen that the received signal pulse is applied on the grid of tube 119 and that a reference component of the transmitter pulse is supplied through conductors 120 to phase-shifting network 121, the output of which is supplied through conductors 121' to the grid of tube 122. Tubes 119 and 122 constitute input tubes to the phase-difference measuring circuit appearing within the rectangle 123 represented in dash lines. This circuit embodies the two tubes 124 and 125. The plates of these tubes are energized from the battery 126 feeding through resistors 127 and 128. The plate of tube 119 connects through resistor 129 with the plate of tube 124 and also through resistor 130 to the cathode of tube 119 and preferably to ground as shown. Similarly, the plate of tube 122 is connected through resistor 131 with the plate of tube 125 and through resistor 132 with the cathode of tube 122 and preferably to ground. It will be noted that the plate of tube 119 connects with resistors 129 and 130 at a common terminal 133 and that the plate of tube 122 connects with resistors 131 and 132 at a common terminal 134. Terminal 133 is connected through conductor 135 to the grid of tube 125 and terminal 134 is connected through conductor 136 with the grid of tube 124.

The above-described circuit operates as follows: Let us assume that under quiescent conditions, that is, when no signal pulse is applied to the grids of 119 or 122, the tube 125 is conducting. When a pulse of the nature of pulse 118 (Fig. 5) is applied to the grid of tube 119, the space current increases in this tube causing the potential at terminal 133 to become lowered, thereby lowering the potential on the grid of tube 125. When this occurs, the space current in tube 125 diminishes and the potential of terminal 134 increases thereby causing the tube 124 to conduct. When tube 124 conducts, the potential of terminal 133 is still further lowered thereby further diminishing the space current in tube 125 and thereby further increasing potential on the grid of tube 124 to increase the current flow therethrough. This operation of tubes 124 and 125 occurs within such an extremely short interval of time as to effect a cut-off of tube 125 and full conduction through tube 124 substantially instantaneously.

In Fig. 5, I have shown a current curve, the portion 137 of which represents the current flow in the cathode circuit of tube 125 and the portion 138 of which represents the current flow in the cathode circuit of tube 124. The cathode circuit of each of tubes 124 and 125 include the common resistor 139, connected at one end to ground. The other end of the resistor 139 is connected through series resistors 140 and 141 to the cathode of tube 124 and through series resistors 142 and 143 to the cathode of tube 125. Hence, the current represented by curve 137 lying to one side of the time axis will flow through resistor 140 and the current represented by the curve 138 lying on the other side of the time axis will flow through resistor 142 so that across resistors 140 and 142 will appear a differential voltage, the voltage across 140 being dependent upon the current flow through tube 125.

It will be seen that when a pulse derived from the receiver is applied to the grid of tube 119 that current will immediately flow through the cathode circuit of tube 124 which will be of a square wave character as indicated at 138, tube 125 cutting off. Subsequently, when a pulse from the transmitter is applied to the grid of tube 122, conduction through tube 124 is immediately cut-off and tube 125 is caused to conduct, producing the similar square current wave 137. Tube 122 functions in a similar manner to tube 119 but to cut-off tube 124 and to cause tube 125 to conduct. In other words, when a pulse is applied to the grid of tube 122, the potential of terminal 134 is lowered thereby diminishing the space current in tube 124 which in turn increases the potential of terminal 133 and the potential on the grid of tube 125. This action causes tube 124 to cut-off and tube 125 to conduct.

As above indicated, when tube 125 conducts, current represented by the curve 137 flows through the cathode resistor 142 and when tube 124 conducts, current represented by the curve 138 flows through the cathode resistor 140. If the length of these current curves measured along the time axis are equal, then the received pulse 118 is situated equidistantly between the transmitted pulses 116 and 117. With the transmission and reception of periodic pulses, the phase-difference measuring circuit continuously reproduces a current output of the character represented by the curves 137 and 138. However, if the pulse 118 were to appear at the time represented by pulse 118a in dotted lines, then tube 125 would be cut-off at the point 144 on the current curve and the current curve would follow the dash line 145, the current curve becoming again reversed when reference pulse 117 is applied to the grid of tube 122. It is clear that under the later assumed conditions, the current output from tube 124 included within the bracket 146 predominates over the current output from tube 125 represented by the bracket 147 and therefore the voltage across resistor 140 will predominate over the voltage across resistor 142.

When the opposite occurs, that is, the received pulse is received at the time represented by the pulse 118b in dash lines, then tube 125 will conduct until the point 148 is reached on the current curve whereupon it will cut-off and tube 124 will conduct, the current following the dash line 149. Under the later assumed conditions, the voltage across resistor 142 will predominate over that across resistor 140. Therefore, the differential voltage output from the phase-difference measuring circuit or the voltages appearing at terminals 150 and 151, with respect to ground, may be utilized to control a servomotor in such a manner as to render these voltages equal or, in other words, to phase shift the reference pulses derived from the transmitter so that they lie equal distances on opposite sides of the received pulse.

In the embodiment of my invention shown in Fig. 4, I have shown a conventional phase-shifting network including the resistors 152 and 153 connected in a closed series circuit with variable condensers 154 and 155. The leads 120 from transmitter 2 are connected to apply a pulse across the resistor 152 and condenser 154 in series and across the resistor 153 and condenser 155 in series. The leads 121', which connect with the grid and cathode respectively of the input tube 122 of the phase-difference measuring circuit, are connected across resistor 152 and condenser 155 in series and also across resistor 153 and condenser 154 in series. The capacitance of these condensers is varied by the servomotor 115, the mechanical connection therebetween being represented by the dot-dash line 156.

From the foregoing, it should be apparent that under the assumed condition of operation the output of the phase-difference measuring circuit will operate through the servomotor amplifier, hereinafter described, to cause the servomotor to phase shift the reference pulses derived from the transmitter in such a direction as to produce equal intervals of time between the transmitted and received pulse and the next consecutive transmitted pulse. Under these conditions, the displacement output of the servomotor will constitute a measure of range and it will function to track the range of a target, that is, to provide a displacement in its output varying in accordance with variations or changes in range of the selected target.

In order to control the servomotor from the voltages appearing between the terminals 150 and 151 and ground, I preferably provide a converter stage so that, from the differential voltages, a single voltage may be derived proportional to the difference therebetween, but which varies one way or the other from ground potential depending upon which one of the differential voltages predominates. This function is carried out by the tube 157 to the grid of which one of the voltages, such as that appearing on terminal 151, is applied. The plate circuit of tube 157 includes resistor 158 connected at one end to said plate and at its other end with a source of negative potential. A feedback circuit including resistor 159 is connected between the grid of tube 157 and a suitable point 160 intermediate the length of resistor 158. Point 160 is connected to one end of a resistor 161 and to the end of this resistor is connected the terminal 150 of the output of the phase-difference measuring circuit. A suitable point 162 on resistor 161 connects with conductor 200 which supplied the signal derived from resistor 161 to the phase inverter stage of the modulator and amplifier hereinafter described. The foregoing circuit is so arranged that when the voltages appearing between terminals 150 and 151 and ground are equal, the potential at point 162 on resistor 161 will be at ground potential and when the voltage derived from terminal 150 or 151 increases over the other, the potential of point 162 will vary one way or the other from ground potential depending upon which one of the input voltages of this circuit predominates over the other.

The conductor 200 functions to apply the potential of point 162 on resistor 161 to the grid of tube 163 of a phase inverter stage including the tubes 163 and 164. The grid of tube 164 is connected through a suitable resistor 165 and conductor 166 with a PM generator 167 which is driven by the servomotor 115. A detailed discussion of the operation of the PM generator to provide damping in the servomotor system is believed unnecessay as it is a well known expedient.

The plates of tubes 163 and 164 of the phase inverter stage are connected to opposite ends of coupling resistors and directly through conductors 168 and 169, respectively, with the grids of tubes 170 and 171. These tubes are embodied in a modulator stage which includes the primary of an output transformer 172 and the secondary of an input transformer 173, the primary of which is connected to a suitable source of alternating current 201. The modulator stage functions to provide an alternating current output which is dependent in amplitude upon the magnitude of the unidirectional signal voltages derived from the converter stage and in phase sense upon the polarity sense of the unidirectional signal voltage or whether it is above or below ground potential.

The secondary of transformer 172 constitutes the input to an amplifier stage comprising the tubes 174 and 175. The plates of tubes 174 and 175 are energized from a suitable source of potential as indicated and the plate circuits include the differential field windings 176 and 177 of the servomotor 115. The armature of servomotor 115 is preferably energized from source 201 of alternating current, as illustrated.

With the above-described arrangement of modulator and amplifier stages, the applied signal voltage will control the direction and also the rate of operation of the servomotor 115. If the range of the distant target, as above described, were to increase, the signal voltage applied to the servomotor amplifier, as derived from the phase-difference measuring circuit and the converter stage will cause the servomotor to operate in a direction phase shifting the transmitter reference pulses in such a direction as to equalize the differential voltages appearing in the output of the phase-difference measuring circuit and thereby increasing its displacement output or the measure of range obtained therefrom. In other words, servomotor 115 will be controlled both in direction and in rate to effect range tracking of a distant object or target, and the displacement of the servomotor will be a measure of such range. Hence, such measurement may be derived directly from the output shaft 75 of the servomotor 115.

Since the gain and response control of the azimuth and elevation amplifiers and their associated damping networks may be identical, a description of the azimuth channel and the manner in which the gain and response thereof is rendered dependent upon the magnitude of the range of the object being tracked as determined by the apparatus just described, should be clearly apparent from a description of the gain and response control of the azimuth amplifier and its stabilizing control means which is illustrated in detail in Fig. 2.

Referring now to Fig. 2, which we may assume is a disclosure of the circuit components employed in the control of the azimuth servomotor, it will be seen that the azimuth detector or phase sensitive demodulator is shown within the dash-line outline 20 and corresponds to the similarly designated rectangle in Fig. 1. The circuit which is connected to the output of demodulator 20 and which connects with the field windings 91 and 92 of generator 26 constitutes the gain and response control amplifier designated by reference numeral 24 in Fig. 1.

In Fig. 2, the output of receiver 11 is supplied through a cathode follower stage represented generally at 52 to the primary of an input transformer 53. The secondary 54 of transformer 53 is connected to the plates or cathodes, as the case may be, of rectifier tubes 55, 56, 57 and 58. The grids of these tubes are energized from one of the phases of the two-phase spin frequency generator 9. In the embodiment illustrated, the primary 59 of transformer 60 is connected to the spin frequency generator 9 and the secondary of said transformer comprises four windings 61, 62, 63 and 64 which are respectively connected to the grids of tubes 55–58. This circuit, which forms no part of the present invention, functions as a full wave, phase-sensitive demodulator or rectifier to supply a unidirectional signal voltage across resistor 65 in the output thereof, which has a magnitude proportional to the amplitude of the input signal and a polarity depending upon the phase sense of the input signal relative to the spin frequency generator voltage which is supplied to the demodulator. A filtering condenser 66 may be connected across output resistor 65.

The output of demodulator 20, which is a unidirectional voltage proportional to the azimuth component of the error angle or the angle between the directivity axis of the scanner and the direction to the target, is supplied in the embodiment illustrated across the series connected winding 37 of potentiometer 79.

The position of wiper 78 on the winding 37 of potentiometer 79 determines the level of the input signal to the azimuth servo amplifier as above described and since the wiper 78 is positioner in accordance with the measure of range by shaft 77, gearing 76, and output shaft 75 of range measuring circuit 31 above described, the level of the input signal to the azimuth servo amplifier will be proportional to the range of the object being tracked.The potentiometer 79 is wound in such a manner as to vary the input signal level in an inverse proportion, that is, if the tracked target has a large range the input signal level, which controls the gain of the servomotor system, will be low and for close in targets the signal level will be relatively high. However, the signal level can never go to zero since it is essential to always maintain a certain amount of error signal. This is accomplished by providing a resistor 67 at the ground end of winding 37 of suitable magnitude to maintain the desired minimum error signal.

The fractional part of the control signal which is derived from potentiometer 79, is sufficient to provide adequate gain for all ranges of operation of the tracking system. This signal may be supplied to an integrating network, which functions as a system response control as shown in more detail in Fig. 3.

In the illustrative embodiment of my invention shown in Figs. 2 and 3, an automatically adjustable means is provided for the purpose of changing the gain of the amplifier and mainly for changing the time constant of the integrating network and thereby the response of the amplifier.

In Fig. 3 there is shown a means for simultaneously controlling both the gain and response characteristics of a tracking servomotor system. As shown, the system gain and system response control comprises a pair of series connected potentiometers having their respective wipers insulated from one another, the wipers being rotated in accordance to range through shaft 77, above described. One winding 37′ and its respective wiper 78′ controls the gain of the servo system in accordance to range and the other winding 70 and its wiper 71 controls the response of the servo system in accordance to range. The winding 70 and capacitance 72 together form an integrating network whose time constant is variable in accordance with range through the position of wiper 71. The windings 37' and 70 are connected in series so that as the range of the target increases or decreases the gain and response of the system will simultaneously decrease or increase.

From the foregoing, it will be clear that the potentiometers 37', 78' and 70, 71 are operable primarily to control the gain of the servo amplifier and also the response. The input stage of the D. C. amplifier herein illustrated includes the tube 74 which receives the modified control signal from detector 20 and tube 86. These tubes are illustrated as pentodes, although other types of tubes may be employed, serving as amplifiers and supplying the outputs thereof through leads 87 and 88 to the control grids of tubes 89 and 90, respectively. The plates of tubes 89 and 90 are connected in push-pull relationship across the field windings 91 and 92 of generator 26. Hence, the voltage outputs of tubes 89 and 90 oppose each other to provide equal and opposite generator exciting fields under quiescent conditions when no signal is supplied to the D. C. amplifier on lead 85 or on lead 35. Under this condition, the generator 26 which is driven by motor 29 supplies no output voltage across lead 27 and therefore the servomotor does not operate. The D. C. amplifier operates as a balanced amplifier and effects an operation of the servomotor 28 in one direction or the other depending upon the polarities of the signal voltages supplied thereto on leads 85 and 35 and drives the motor at a rate dependent upon the algebraic sum of said signal voltages.

For damping purposes, the PM generator 32, hereinbefore described, is driven from servomotor 28 and its output is supplied to the damping network 34. This damping network may be considered as a differentiating network and in the embodiment illustrated comprises a resistance 93 and a condenser 94 which are connected in series across the output of the PM generator. The common connection between resistance 93 and condenser 94 may be connected to ground as shown and the opposite end of resistance 93 is connected to winding 96 of feedback or stability control potentiometer 95 and lead 35 to the control grid of tube 86 hereinbefore described as embodied in the input stage of the D. C. amplifier. With the arrangement of the network as shown, no damping voltage or degeneratively acting voltage will be supplied to the D. C. amplifier under constant output speeds of the servomotor 28. Under transient conditions, however, a damping voltage will be supplied through lead 35 to the D. C. amplifier to effect its predesigned purpose.

As hereinabove pointed out, I propose in the present invention not only to control the gain and response of the tracking servomotor system by varying the level of the signal and time constant of the associated integrating network to the azimuth servo amplifier, but also to control the stability of the system in accordance to range by varying the level of the degenerative feedback signal derived from rate or speed generator 32. Thus, as above indicated, I provide in the output of speed generator 32 a potentiometer 95 whose wiper 97 controls the level of the feedback signal on lead 35 connected thereto and since the wiper 97 is rotated by the range output shaft 75, the level of the signal on lead 35 is varied in accordance to the range of the object being tracked. It will be understood of course, that the values of the windings and gear ratios of the positioning shafts connecting the wipers of the potentiometers are so chosen that their output voltages will be varied in proportional amounts, that is, their outputs will increase or decrease, as the case may be, substantially equally under all operating conditions. On the other hand, if under certain operating conditions, it is desired to vary the output voltages of the potentiometers in a non-proportional and non-linear fashion, the potentiometers may be wound non-linearly or the wipers thereof may be rotated in a non-linear fashion by suitable mechanism associated therewith.

Referring now to Fig. 6 of the drawings, I have illustrated a modification of the invention illustrated in Figs. 1 to 4. In these latter figures, the overall gain of the servomotor tracking system is continuously varied in accordance with a measure of the magnitude of the range of the object being tracked. however, in the modification shown in Fig. 6 there is provided means for controlling the gain of the system in a step-by-step fashion. Accordingly, I vary the gain of the tracking servomotor system by successively varying the gain of the error signal channel and preferably also the speed repeat-back or stabilization channel of both azimuth and elevation servo amplifiers. Only the gain control of the azimuth amplifier will be described, it being understood that the elevation amplifier is controlled in an identical manner. For this purpose, I have shown a grid-cathode resistor 186 associated with tube 74 of the azimuth servo amplifier 24 having a variable positive biasing signal introduced, at a suitable point, thereto. This biasing voltage which is applied to the grid of tube 74 is obtained from the positive side of a suitable grid bias battery 187. Resistor 188 is provided so that the desired positive voltage on the lead 189 may be initially selected and also to insure a substantially constant biasing voltage source.

For varying the amount of biasing voltage to the control grid of tube 74, I have shown a plurality of resistors 190, 191 and 192 connected in parallel between the positive side of battery 187 and grid bias resistor 186. Resistors 191 and 192 may be successively removed from the parallel circuit through action of spring biased relay armatures 183 and 184 to be described.

The output of the range measuring circuit 31 may, in the modification of Fig. 6, control the magnitude of the voltage in winding 180 of relay 181 in accordance with the magnitude of the range of the object being tracked to thereby actuate armatures 183 and 184. Amplifier 182 is employed to provide a voltage in winding 180 which will vary inversely as the range of the object, that is, if the target or object is at a short range the voltage in winding 180 will be relatively high and vice versa.

The operation of the grid biasing circuit of Fig. 6 is as follows. Let us assume that the object being tracked is at a short range from the tracker mechanism. In such a case the relay armatures 183 and 184 will be in the position shown, and all of the parallel connected resistors will be in a circuit, thereby providing maximum biasing voltage on the grid of tube 74. As a result of the high biasing voltage, servo amplifier 24 will operate with its highest possible gain. The relatively high voltage in relay winding 180 is sufficient to overcome both restraining springs 185 and 186' respectively associated with armatures 183 and 184.

However, if the target should be at an intermediate range the voltage in winding 180 of relay 181 will decrease and such decrease will cause spring 185 of armature 183 to open to effectively remove parallel resistor 191 from the circuit. Such removal will cause the resistivity effect of the remaining resistances to increase thereby decreasing the biasing voltage applied to the grid of tube 74. This decrease in voltage will cause a decrease in the gain of servo amplifier 24.

In the case of a target at a great range, the gain of the servo amplifier should be relatively low because of the low angular velocities involved under such range conditions as above described. The voltage in winding 180 of relay 181 will be low and therefore restraining spring 186' associated with relay armature 184 will remove parallel resistor 192 from the circuit. Therefore, the resistivity of resistor 190 will be high and the resulting biasing voltage on tube 74 will be low thus lowering the gain of the signal channel of azimuth servo amplifier 24.

It will be understood, of course, that the number of gain-varying steps may be increased or decreased by adding or removing parallel resistances and associated spring biased relay armatures in the grid biasing circuit. It is also desirable to control the gain of tube 86 of amplifier 24 in the exact same manner thus varying the gain of the speed feedback channel thereof in accordance with range. Since the circuit for accomplishing this may be exactly the same as above described, I have omitted a detailed description thereof.

The circuit shown in Fig. 7 will simultaneously control the bias of both the error signal channel and the speed feedback channel of amplifier 24 by respectively varying the gain of tubes 74 and 86 by the same variable grid biasing signal. In this modification the output of the range measuring circuit appears as rotation of shaft 75', as explained in the description of Figs. 1 and 4, which positions the wiper 193 of potentiometer 194. The winding 195 of potentiometer 194 is connected across grid biasing battery 137. The position of wiper 193 on winding 195 determined the magnitude of the biasing voltage applied to the control grids of tubes 74 and 86 through tapped resistances 196 and 197. The modification shown in Fig. 7 thus provides a continuous adjustment of the gain of both channels of servo amplifier in accordance with the magnitude of the range of the object being tracked.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim is:

1. In a radio system for tracking a distant object, a directable radio locating device, a radio transmitter for said device for transmitting radio energy into space along a directive axis, a radio receiver for said device for receiving reflected radio energy from the distant object providing a range output and an output corresponding to the radial displacement of the object from the directive axis, a tracking servomotor for directing said radio locating device responsive to the displacement output of said radio receiver, gain varying means coupling said radio receiver and said tracking servomotor, response varying means coupling said radio receiver and said tracking servomotor, stability varying means for said servomotor, and means for varying said gain coupling means, said response coupling means and stability varying means in accordance with the range output of said radio receiver whereby the gain, response and stability of the system including the servomotor varies inversely with the range of the object from the locating device.

2. In a radio system for tracking a distant object, a directable radio locating device, a radio transmitter for said device for transmitting radio energy into space along a directive axis, a radio receiver for said device for receiving reflected radio energy from the distant object providing a range output and an output corresponding to the radial displacement of the object from the directive axis, a tracking servomotor for directing said radio locating device responsive to the displacement output of said radio receiver, stability varying means for said servomotor, and means for varying said stability varying means in accordance with the range output of said radio receiver whereby the stability of the system including the servomotor varies inversely with the range of the object from the locating device.

3. A radio system for tracking a distant object including a scanner mounted for movement in azimuth and elevation with an antenna having a directivity axis, a transmitter coupled with said antenna for transmitting radio energy into space; receiver means for receiving reflected radio energy from the object providing an output proportional to the range of the object from the scanner, an output proportional to the azimuthal displacement of the object from the directivity axis of the scanner, and an output proportional to the elevational displacement of the object from the directivity axis of the scanner; a tracking servomotor for moving said scanner in azimuth responsive to the azimuthal displacement output of said radio receiving means, a tracking servomotor for moving said scanner in elevation responsive to the elevational displacement output of said radio receiving means, gain varying means coupling the azimuthal displacement output of said receiving means and said azimuth servomotor, gain varying means coupling the elevational displacement output of said receiving means and said elevation servomotor, and means for varying said azimuthal and elevational coupling means in accordance with the range output of said receiving means whereby the gain of the system including the servomotors varies inversely with the range of the object from the scanner.

4. A radio system for tracking a distant object including a scanner mounted for movement in azimuth and elevation with an antenna having a directivity axis, a transmitter coupled with said antenna for transmitting radio energy into space; receiver means for receiving reflected radio energy from the object providing an output proportional to the range of the object from the scanner, an output proportional to the azimuthal displacement of the object from the directivity axis of the scanner, and an output proportional to the elevational displacement of the object from the directivity axis of the scanner; a tracking servomotor for moving said scanner in azimuth responsive to the azimuthal displacement output of said radio receiving means, a tracking servomotor for moving said scanner in elevation responsive to the elevational displacement output of said radio receiving means, response varying means coupling the azimuthal displacement output of said receiving means and said azimuth servomotor, response varying means coupling the elevational displacement output of said receiving means and said elevation servomotor, and means for varying said azimuthal and elevational coupling means in accordance with the range output of said receiving means whereby the response of the system including the servomotors varies inversely with the range of the object from the scanner.

5. A radio system for tracking a distant object including a scanner mounted for movement in azimuth and elevation with an antenna having a directivity axis, a transmitter coupled with said antenna for transmitting radio energy into space; receiver means for receiving reflected radio energy from the object providing an output proportional to the range of the object from the scanner, an output proportional to the azimuthal displacement of the object from the directivity axis of the scanner, and an output proportional to the elevational displacement of the object from the directivity axis of the scanner; a tracking servomotor for moving said scanner in azimuth responsive to the azimuthal displacement output of said radio receiving means, a tracking servomotor for moving said scanner in elevation responsive to the elevational displacement output of said radio receiving means, gain varying means coupling the aximuthal displacement output of said receiving means and said azimuth servomotor, response varying means coupling the azimuthal displacement output of said receiving means and said azimuth servomotor, gain varying means coupling the elevational displacement output of said receiving means and said elevation servomotor, response varying means coupling the elevational displacement output of said receiving means and said elevation servomotor, and means for varying both gain and response coupling means for said azimuthal and elevational servomotors in accordance with the range output of said receiving means whereby the gain of the system including the servomotors varies inversely with the range of the object from the scanner.

6. A radio system for tracking a distant object including a scanner mounted for movement in azimuth and elevation with an antenna having a directivity axis, a transmitter coupled with said antenna for transmitting radio energy into space; receiver means for receiving reflected radio energy from the object providing an output proportional to the range of the object from the scanner, an output proportional to the azimuthal displacement of the object from the directivity axis of the scanner, and an output proportional to the elevational displacement of the object from the directivity axis of the scanner; a tracking servomotor for moving said scanner in azimuth responsive to the azimuthal displacement output of said radio receiving means, a tracking servomotor for moving said scanner in elevation responsive to the elevational displacement output of said radio receiving means, gain varying means coupling the azimuthal displacement output of said receiving means and said azimuth servomotor, response varying means coupling the azimuthal displacement output of said receiving means and said azimuth servomotor, stability varying means for said azimuth servomotor, gain varying means coupling the elevational displacement output of said receiving means and said elevation servomotor, response varying means coupling the elevational displacement output of said receiving means and said elevation servomotor, stability varying means for said elevation servomotor, and means for varying said gain coupling means, said response coupling means and said stability varying means for both said azimuth and elevation servomotors whereby the gain, response and stability of the system including the servomotors varies inversely with the range of the object from the scanner.

7. A radio system for tracking a distant object including a scanner mounted for movement in azimuth and elevation with an antenna having a directivity axis, a transmitter coupled with said antenna for transmitting radio energy into space; receiver means for receiving reflected radio energy from the object providing an output proportional to the range of the object from the scanner, an output proportional to the azimuthal displacement of the object from the directivity axis of the scanner, and an output proportional to the elevational displacement of the object from the directivity axis of the scanner; a tracking servomotor for moving said scanner in azimuth responsive to the azimuthal displacement output of said radio receiving means, a tracking servomotor for moving said scanner in elevation responsive to the elevational displacement output of said radio receiving means, stability varying means for said azimuth servomotor, stability varying means for said elevation servomotor, and means for varying said azimuth and elevation stability varying means in accordance with the range output of said receiving means whereby the stability of the system including the servomotors varies inversely with the range of the object from the scanner.

8. In a radio system for tracking a distant object, a directable radio locating device, a radio transmitter for said device for transmitting radio energy into space along a directive axis, a radio receiver for said device for receiving reflected radio energy from the distant object and for providing an output corresponding to the radial displacement of the object from said directive axis, a tracking servomotor for directing said radio locating device in response to the displacement output of the radio receiver, range-measuring means connected to said receiver and responsive to the reflected energy for producing an output proportional to the range of the object from the locating device, and a control circuit connecting said receiver to said tracking servomotor, said circuit including controllable gain varying means connected in controlled relation to the output of said range-measuring means such that the gain of the system is made to vary inversely with the range of the object from said device.

9. In a radio system for tracking a distant object, a directable radio locating device, a radio transmitter for said device for transmitting radio energy into space along a directive axis, a radio receiver for said device for receiving reflected radio energy from the distant object and for providing an output corresponding to the radial displacement of the object from said directive axis, a tracking servomotor for directing said radio locating device in response to the displacement output of the radio receiver, range-measuring means connected to said receiver and responsive to the reflected energy for producing an output proportional to the range of the object from the locating device, and a control circuit connecting said receiver to said tracking servomotor, said circuit including controllable response varying means connected in controlled relation to the output of said range-measuring means such that the response of the system is made to vary inversely with the range of the object from said device.

10. The radio system of claim 9 wherein the control circuit further includes controllable gain varying means connected in controlled relation to the output of said range-measuring means such that the response and the gain of the system, respectively, are made to vary inversely with the range of the object from the locating device.

References Cited in the file of this patent

UNITED STATES PATENTS

| | | |
|---|---|---|
| 2,412,612 | Godet | Dec. 17, 1946 |
| 2,444,171 | Sanders | June 29, 1948 |
| 2,446,024 | Porter | July 27, 1948 |
| 2,467,208 | Hahn | Apr. 12, 1949 |
| 2,473,175 | Ridenour | June 14, 1949 |
| 2,515,248 | McCoy | July 18, 1950 |
| 2,550,700 | Lancor | Mar. 1, 1951 |